United States Patent [19]
Jonishi et al.

[11] Patent Number: 5,269,640
[45] Date of Patent: Dec. 14, 1993

[54] HOLDING DEVICE FOR USE IN ASSEMBLING MECHANICAL MEMBERS

[75] Inventors: Hiroshi Jonishi; Masao Sakai; Yoshinori Kanou; Susumu Kitajima; Yoshiaki Nishimura, all of Toyota; Hiroshi Kazino, Aichi; Masaaki Ide, Aichi; Tomiyasu Kakeno, Aichi; Hiromichi Mizuno, Aichi; Yoshihiro Murase, Aichi; Hideki Kakamu, Aichi, all of Japan

[73] Assignee: Aoyama Seisakusho Co., Ltd., Aichi, Japan

[21] Appl. No.: 888,973

[22] Filed: May 26, 1992

[30] Foreign Application Priority Data

Jun. 3, 1991 [JP] Japan .................. 2-50448[U]

[51] Int. Cl.⁵ ............................... F16B 13/06
[52] U.S. Cl. ........................... 411/55; 411/182
[58] Field of Search ............ 411/55, 182, 401, 44, 411/41, 918; 24/297, 674

[56] References Cited

U.S. PATENT DOCUMENTS

| | | | |
|---|---|---|---|
| 2,346,769 | 4/1944 | Lichtor | 411/396 X |
| 2,936,015 | 5/1960 | Rapata | 411/182 |
| 3,248,995 | 5/1966 | Meyer | 411/337 |
| 3,313,083 | 4/1967 | Flora | 24/297 X |
| 3,841,044 | 10/1974 | Brown et al. | 24/297 X |
| 4,038,801 | 8/1977 | Busch | 411/396 X |
| 4,186,645 | 2/1980 | Zaydel | 411/55 |
| 4,358,234 | 11/1982 | Takegawa et al. | 411/182 X |
| 4,503,486 | 3/1985 | Makita | 411/427 X |
| 4,976,578 | 12/1990 | Mathes et al. | 24/297 X |
| 5,175,911 | 1/1993 | Terrels et al. | 411/44 X |

FOREIGN PATENT DOCUMENTS

| | | | |
|---|---|---|---|
| 287302 | 3/1965 | Australia | 24/297 |
| 1450932 | 3/1969 | Fed. Rep. of Germany | 24/297 |

Primary Examiner—Rodney M. Lindsey
Attorney, Agent, or Firm—Frishauf, Holtz, Goodman & Woodward

[57] ABSTRACT

A holding device for use in assembling mechanical members comprises a joint head having a spherical head and a fastener formed continuous with the spherical head; and a clip having a joint cavity member formed of an elastic material, the joint cavity member having a groove portion having a cross-section corresponding in shape to an external shape of the spherical head, and receiving lip portions formed continuous with the groove portion, the receiving lip portions spreading outward, and a fastener formed continuous with the joint cavity member. The spherical head of the joint can be fitted in the groove portion to be held therein, whereby a member which is fastened to the fastener of the joint head and a member which is fastened to the fastener of the clip can be preliminarily held to each other. The invention provides the preliminarily-holding device for use in assembling mechanical members, which is capable of causing a part (e.g. a bumper of an automotive vehicle) having destortion in its formed shape to be preliminarily held onto a body (e.g. of the vehicle) having dimensional or positional errors in assembly, while absorbing deviations in the positional relationship between the part and body to be assembled.

7 Claims, 4 Drawing Sheets

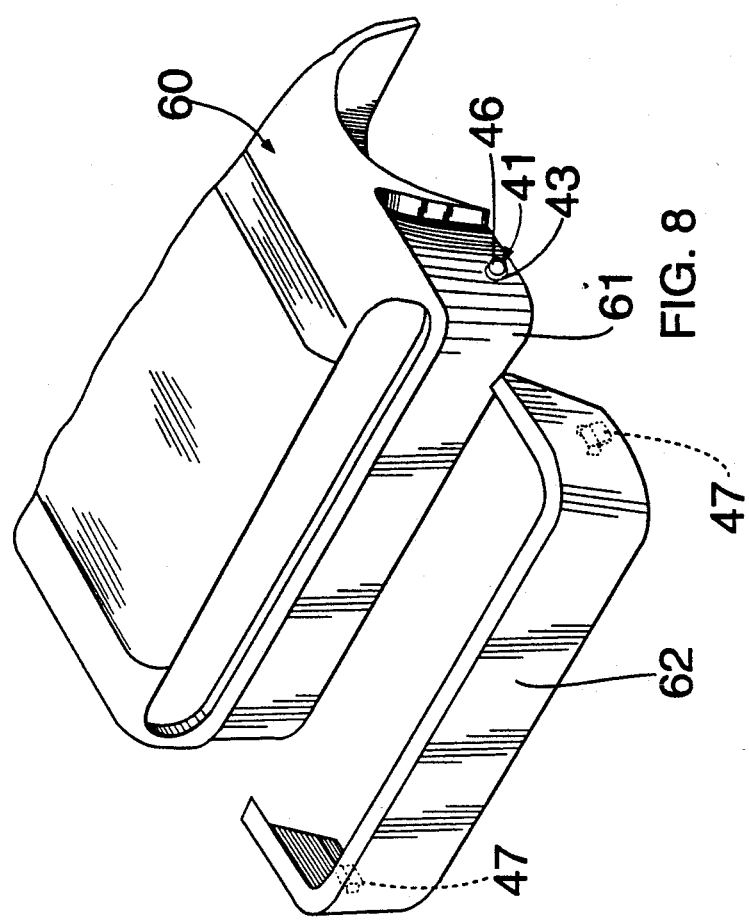
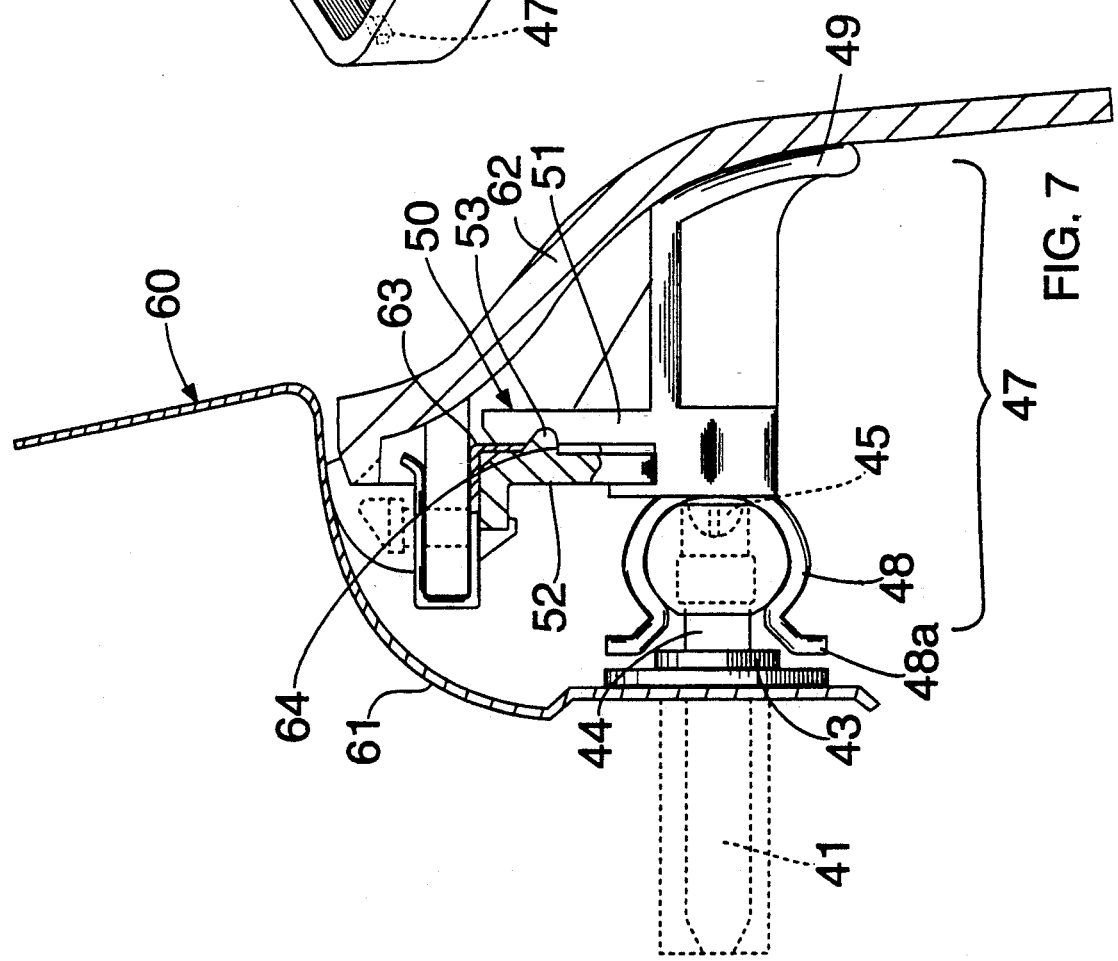

HOLDING DEVICE FOR USE IN ASSEMBLING MECHANICAL MEMBERS

BACKGROUND OF THE INVENTION

The invention relates to a holding device for use in assembling mechanical members, which is useful e.g. when assembling an automotive vehicle, in preliminarily holding a part which is relatively large in size and requires much labor in mounting, such as a bumper and a rear lamp, onto a body of the vehicle.

Conventionally, in mounting a rear lamp on a body of an automotive vehicle, as shown in FIG. 4, a fixture member 30 is mounted on the body beforehand, and then a rear lamp stay 31 mounted on the rear position lamp is caused to engage with claws 32 of the fixture member 30 so that the stay 31 is held by the claws 32. However, the fixture member 30 has almost no degree of freedom to the inclination of the rear lamp relative to the body. Therefore, when a rear position lamp having distortion in its formed shape is to be mounted on the body, it has been required to carry out mounting work while correcting a deviation in the positional relationship between the members to be assembled, by hands of workers.

Accordingly, the step of mounting a rear position lamp on a body cannot dispense with manual labor, because even if it is attempted to automate the assembling process, it is very difficult for a robot, which performs an accurate motion in a predetermined and unadaptable manner, of an automatic assembly machine, to effect the mounting work, due to possible distortion in the formed shape of the rear lamp and dimensional and/or positional errors in assembly of the body, which has hitherto made it impossible to automatically mount the rear lamp on the body of an automotive vehicle.

On the other hand, a bumper is usually mounted on a body of an automotive vehicle by bolting the former to the latter. However, when a bumper having distortion in its formed shape is to be mounted on a body having dimensional and/or positional errors in assembly has been required that more than one worker perform the mounting work while correcting deviation in the positional relationship between the members to be assembled, by force.

Therefore, the process of mounting a bumper on a body has required many hands of workers. If it is attempted to automate the assembling process, it is very difficult for a robot, which performs; accurate motion in a predetermined and unadaptable manner, or an automatic assembling machine, to effect the mounting work, due to possible distortion in the formed shape of the bumper and dimensional and/or positional errors in assembly of the car body, which has hitherto made it impossible to automatically mount the bumper on the car body.

SUMMARY OF THE INVENTION

It is an object of the present invention to provide a holding device for use in assembling mechanical parts, which is capable of preliminarily holding a part having distortion in its formed shape onto a body having dimensional and positional errors in assembly while absorbing a deviation in the positional relationship between the members to be assembled, when the former is mounted on the latter.

It is a further object of the invention to provide a holding device for use in assembling mechanical members, which is capable of contributing to automating assembly work which is not free from dimensional and/or positional errors in assembly.

To attain the above objects, the present invention provides a holding device for use in assembling mechanical members, which comprises a joint head having a substantially spherical head and a fastener formed continuous with the substantially spherical head, and a clip having a joint cavity member formed of an elastic material, the joint cavity member having a groove portion having a cross-section corresponding in shape to an external shape of the substantially spherical head, and a receiving lip portion formed continuous with the groove portion, the receiving lip portion spreading outward, and a fastener formed continuous with the joint cavity member. The holding device having the above construction operates in such a manner that the substantially spherical head of the joint head can be fitted in the groove portion to be held therein, whereby a member which is fastened to the fastener of the joint head and a member which is fastened to the fastener of the clip are preliminarily held to each other.

The joint head is formed such that it can perform a sliding or rotating motion within the joint cavity member. The present device can absorb dimensional and/or positional errors in assembly by virture of such motion. The sphericity of the term "spherical head" is not intended to strictly mean a geometrically-defined sphericity, but it may be more or less distorted (i.e., it may be "substantially" spherical) so long as the above-mentioned sliding or rotating motion is permitted thereby.

The term "fastener" is intended to include a screw, adhesive, weld, etc. When the joint head is inserted into the groove portion of the joint cavity member, the joint cavity member is once expanded to receive the joint head thereinto, and when the spherical head is completely inserted into the groove portion, the expanded joint cavity member contracts. The joint cavity member is required to be elastic enough to perform such an expanding and contracting motion.

In one preferred embodiment of the present invention, the holding device comprises a grommet formed of a synthetic resin material, the grommet having a fitting leg having at least one catching projection formed thereon, and a hollow substantially spherical head formed continuous with top of the fitting leg by way of a portion having a flange formed thereon, the grommet having a central hole formed therein, the grommet being fitted in each of grommet-holding holes arranged in a lamp-mounting surface of a body of an automotive vehicle in parallel arrangements; a screw screwed into the central hole in the grommet to thereby cause the grommet to be held in the each of grommet-holding holes; and an elastic clip having an engaging groove portion formed such that the engaging groove portion has a cross-section corresponding in shape to the external shape of the hollow substantially spherical head, a plurality of the elastic clips being fastened to a reverse side of a rear lamp for the automotive vehicle in parallel arrangements, wherein the engaging groove portion of the elastic clip is caused to make engagement with the hollow spherical head of the grommet, whereby the rear lamp is preliminarily held onto the body.

In such preferred embodiment of the holding device, the fixing leg is inserted into the grommet-holding hole of the body of the automotive vehicle, and the internal edges of the body defining the grommet-holding hole are caused to be caught between the catching projections formed on the fitting leg and the flange, whereby the grommet is held in the body. The engaging groove portion of each of the elastic clips fastened to the reverse sides of the rear lamp is caused to make engagement with the substantially spherical head of the synthetic resin grommet held in the body as described above. Therefore, even if there is some distortion in the formed shape of the rear lamp or dimensional and/or positional errors in assembly of the body, deviations in the positional relationship between the two members to be assembled are properly absorbed by elasticity of the elastic clip and sliding or rotating motion of that substantially spherical head within the groove, which makes it possible to preliminarily hold the rear lamp on the body without requiring troublesome labor for correcting the deviation in the positional relationship between the two members to be assembled.

In another preferred embodiment of the present invention, the holding device comprises: by a screw having a substantially spherical head the screw being screwed into body of an automotive vehicle; and an elastic clip having an engaging groove portion formed such that the engaging groove portion has a cross-section corresponding in shape to the external shape of the spherical head, and a receiving lip portion formed continuous with the engaging groove portion, the receiving lip portion spreading outward, the elastic clip being fastened to an inner side of a bumper for the automotive vehicle, wherein the substantially spherical head is caused to make engagement with the elastic clip, whereby the bumper is preliminarily held onto the body.

In such preferred embodiment of the holding device, the screw having the substantially spherical head is screwed into the body of the vehicle, beforehand, while the elastic clip is also fastened to the inner side of the bumper, beforehand. The bumper having the elastic clips fastened thereto is placed along the body, and the engaging groove portion of the elastic clip is caused to make engagement with the substantially spherical head of the screw, whereby the bumper is preliminarily held onto the body. Therefore, even if there is some longitudinal or transverse deviation in the positional relationship between the position of the screw and that of the elastic clip due to distortion in the formed shape of the bumper and dimensional and/or positional errors in assembly of the body, such deviation is properly absorbed. As a result, the bumper can be preliminarily held onto the body without accurately positioning the two members to be assembled.

BRIEF DESCRIPTION OF THE DRAWINGS

FIG. 7 is a partially cut-away side view showing essential parts of the holding device according to the second embodiment; and FIG. 8 is a perspective view showing part of the car body and the whole of a bumper, in a state prior to mounting the bumper on the body.

DETAILED DESCRIPTION OF THE INVENTION

The present invention will now be described in detail with reference to drawings showing embodiments thereof.

1. FIRST EMBODIMENT

Figure 1:
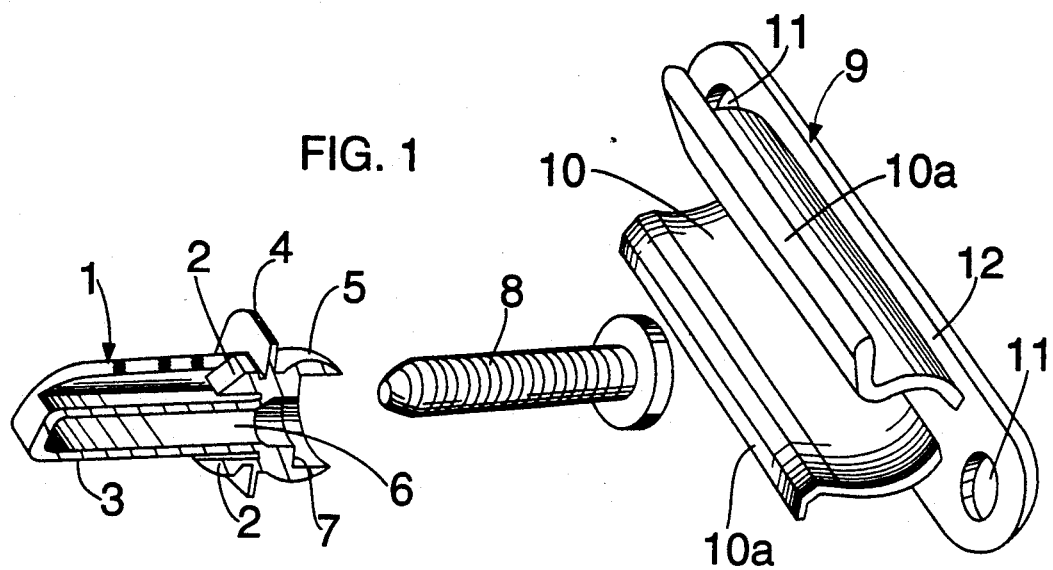
FIG. 1 is a perspective view showing, partly in section, an elastic clip, a screw, and a grommet formed of synthetic resin, constituting a preliminarily-holding device according to a first embodiment of the invention, in their dissociated state.
Figure 2:
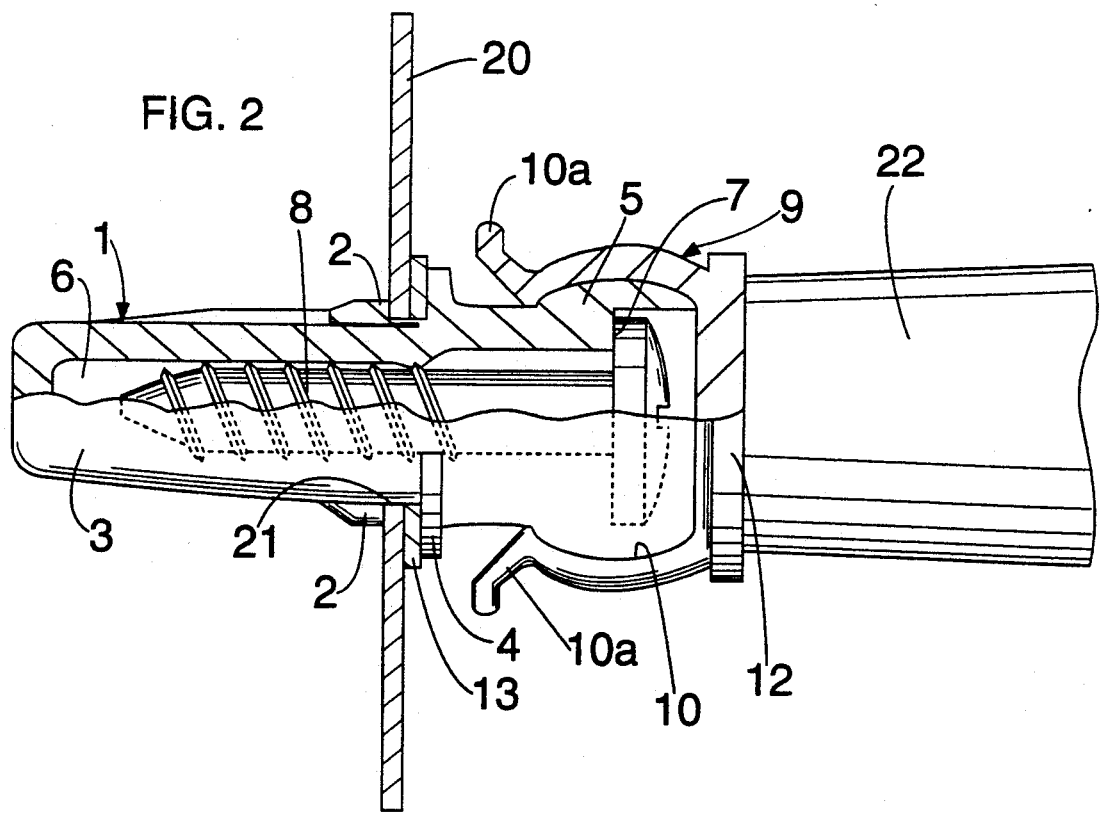
FIG. 2 is a partially cut-away side view showing a state in which a rear lamp is held onto a car body by means of the preliminarily-holding device according to the first embodiment of the invention.

Referring first to FIG. 1, reference numeral 1 designates a synthetic resin grommet made of a rigid polyamide resin. The synthetic resin grommet 1 has a fitting leg 3 in the form of a hollow and bottomed square pillar having two catching projections 2 formed thereon at opposite sides of an intermediate portion of the grommet. Integrally formed on the top of the fitting leg 3 is a hollow spherical head 5 having an opening at one end thereof, which head is continuous with the fitting leg 3 by way of a portion having a flange 4 adjacent to the catching projections 2. As shown in FIG. 2 the fitting leg 3 in the form of a square pillar is inserted through a grommet-holding hole 21 in the form of a square hole formed through a car body 20, and internal edges of the car body 20 defining the grommet-holding hole 21 are caused to be caught between the catching projections 2 and the flange 4, whereby the synthetic resin grommet 1 is held in the car body 20 while being inhibited from rotating. Reference numeral 6 designates a central hole formed in the grommet 1. The hole 6 has a stepped shoulder 7 and extends through the spherical head 5. When a screw 8 is screwed into the central hole 6, the side walls of the fitting leg 3 of the synthetic resin grommet are bulged to displace the catching projections 2 outward. Consequently, the grommet 1 is securely fixed to the car body 20.

On the other hand, reference numeral 9 designates an elastic clip made of a polyacetal resin. The elastic clip 9 has a substantially straight engaging groove portion 10 formed in such a manner that is has a cross-section corresponding in shape to the external shape of the hollow spherical head 5 described above, and a receiving lip portion 10a formed continuous with the respective longitudinal edges of the groove portion 10, the lip 10a extending outward. The groove portion 10 and the receiving lip portion 10a form a main body of the clip 9 having a cross-section in the form of a Greek capital letter omega $\Omega$. A mounting plate 12 having screw holes 11 formed therethrough is formed integrally on the reverse side of the main body. In addition, as shown in FIG. 2, reference numeral 13 designates a sealing rubber washer interposed between the car body 20 and the flange 4 of the grommet 1.

Figure 3:
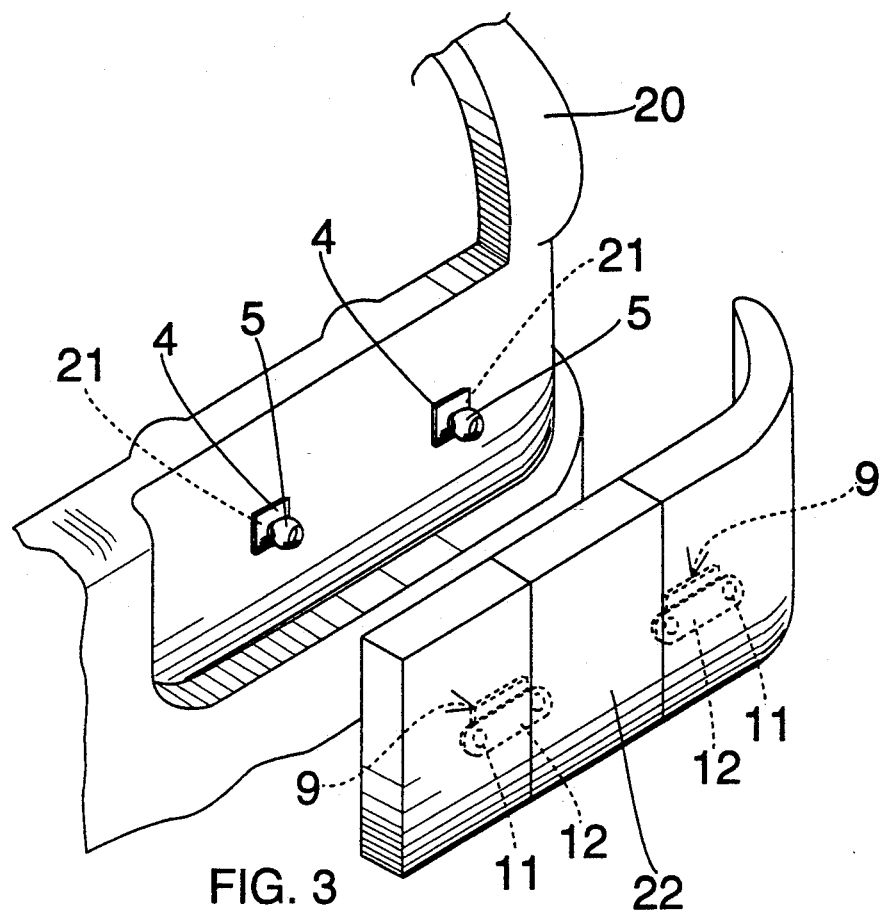
FIG. 3 is a perspective view showing part of the car body and the whole of the rear lamp, in a state prior to mounting the lamp on the body.
Figure 4:
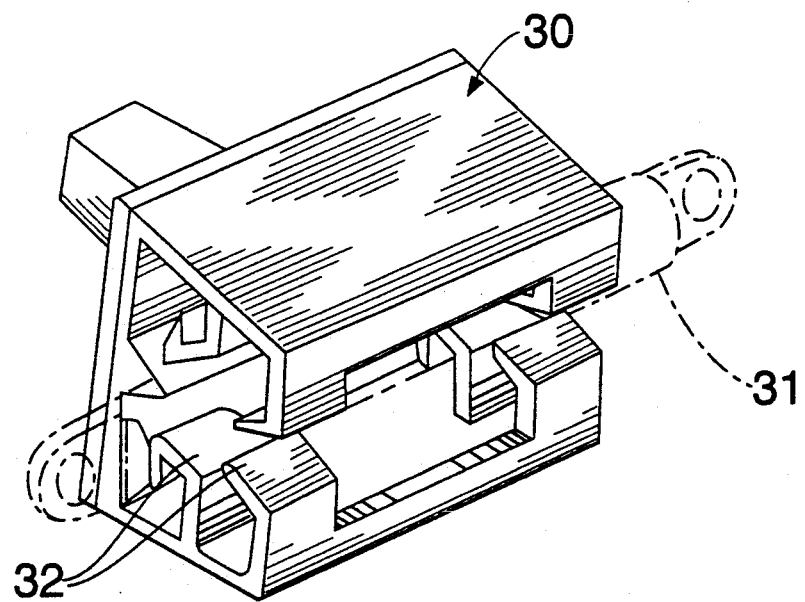
FIG. 4 is a perspective view showing a conventional fixture member for holding a rear lamp onto a car body.

The holding device having the above-described construction is used in the following manner: First, the leg 3 in the form of a square pillar is inserted into the grommet-holding hole 21 in the form of a square formed through a rear portion of the car body 20, and the edges defining the grommet-holding hole 21 are caused to be caught between the catching projections 2 of the fitting leg 3 and the flange 4. Then, the screw 8 is screwed into the central hole 6 formed in the synthetic resin grommet 1 to thereby bulge outwardly the side walls of the fitting leg 3, causing the catching projections 2 to be displaced outward and at the same time inhibiting same from being bent inward. Thus, the grommet 1 is securely fixed to the car body 20, beforehand. Thereafter, as shown in FIG. 3, the rear lamp 22 having the elastic clips 9 mounted in multiple arrangement on the reverse side of the rear lamp is placed along the rear portion of the car body, and the engaging groove portions 10 of the elastic clips 9 are fitted on the spherical heads 5 of the grommets 1, causing the rear lamp 22 to be preliminarily held onto the car body 20.

In the process of preliminarily holding the rear lamp 22 onto the car body 20, even if there is some deviation in the positional relationship between the spherical heads 5 of the grommets 1 fixed to the car body 20 in multiple arrangements, and the engaging groove portions 10 of the elastic clips 9 arranged on the reverse side of the rear lamp 22 in multiple arrangements, due to distortion in the formed shape of the rear position lamp 22 and dimensional and/or positional errors in assembly of the car body 20, such deviation is absorbed by the engaging groove portions 10 formed continuous with the receiving lip portions 10a in such a manner that they turn outward as they extend. Therefore, even a rear lamp 22 having distortion in the formed shape thereof can be easily preliminarily held onto the car body 20 having the dimensional and/or positional errors in assembly. Further, even an automatically-operating machine, such as a robot, which operates with high positioning accuracy, can establish the preliminarily-held state of the rear position lamp, and therefore it becomes possible for the robot or other automatic assembly machines to automatically mount the rear position lamp on the car body.

As is clear from the above, the holding device according to the present embodiment of the invention has many advantageous features. Specifically, the synthetic resin grommet having the hollow spherical head is first engaged in the grommet-holding hole formed through the car body, and then the screw is screwed into the grommet, which provides advantages of a convenient working operation and secure fastening achieved by a high torque. Further, the synthetic resin grommet having the spherical head is assembled with the elastic clip provided with the engaging groove portion having a cross-section corresponding in shape to the spherical head by virtue of elasticity of the two members. Therefore, even a rear lamp having distortions in the formed shape thereof can be easily preliminarily held onto the car body having dimensional and/or positional errors in assembly. Accordingly, the rear lamp can be automatically mounted on the car body by the use of a robot or other automatic assembly machines. As a result, it becomes possible to reduce manufacturing cost by saving labor cost, as well as enhance productivity. Moreover, the preliminarily-holding device comprising the synthetic resin grommet which is accurately and securely held in the grommet-holding hole of the car body through catching between the catching projections and the flange, and the elastic clip associated therewith, does not shake or clatter due to vibration of the vehicle taking place while the vehicle is traveling, once the rear lamp has been finally fixed onto the car, and hence it does not make noise when the vehicle is traveling. Further, since painting provided on the car body cannot be damaged by preliminarily-holding screws, there is no fear of corrosion of the car body which may otherwise occur at the damaged part.

Thus, the present invention, which has solved the problems which conventional preliminarily-holding devices for rear position lamps have had in applying same to automatic assembly, has great value for practical use.

2. SECOND EMBODIMENT

Figure 5:
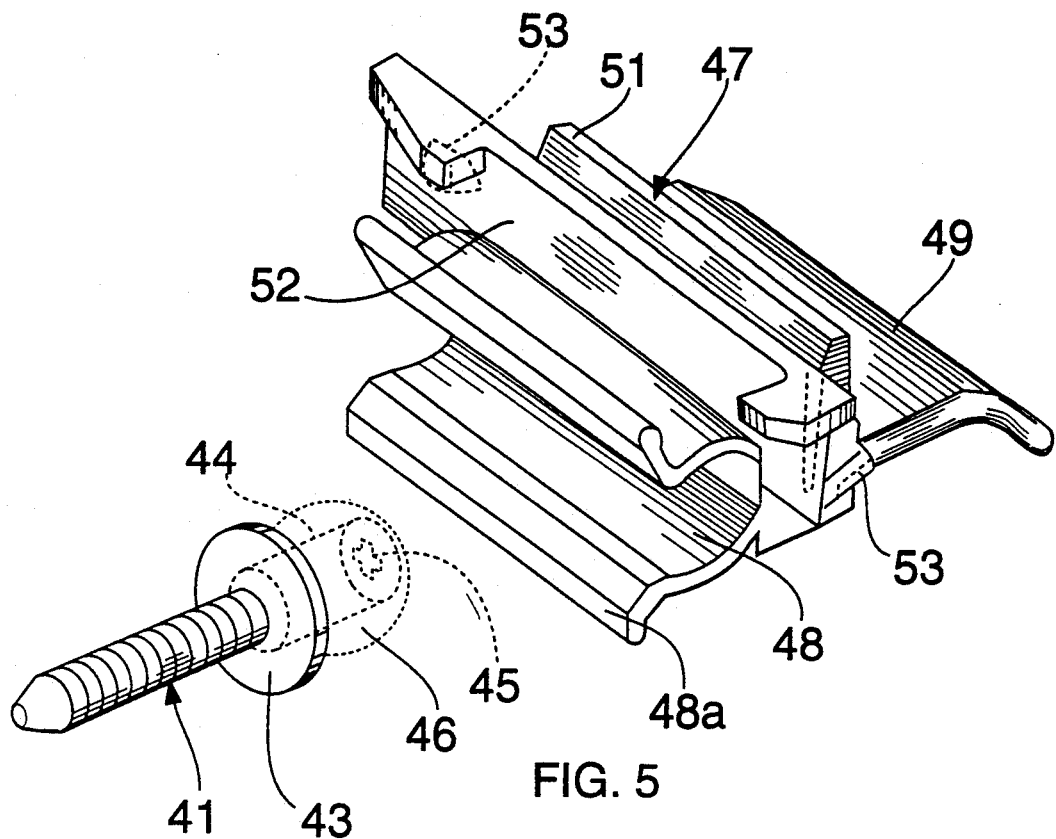
FIG. 5 is a perspective view showing an elastic clip and a screw, constituting a preliminarily-holding device according to a second embodiment of the invention.
Figure 6:
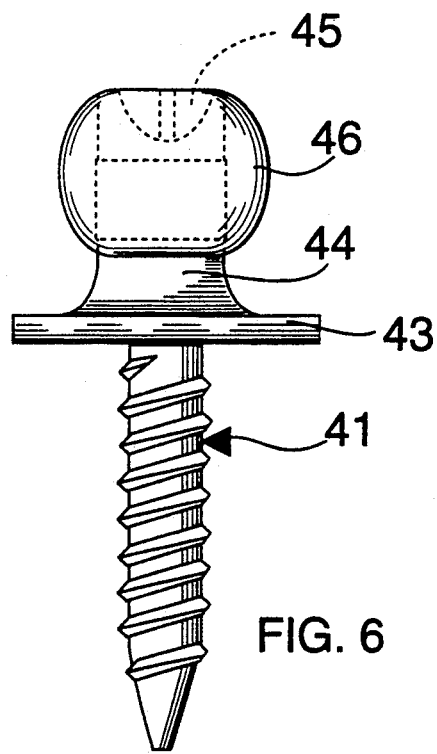
FIG. 6 is a side view showing the screw appearing in FIG. 5.

Next, there will be described in detail a holding device according to a second embodiment of the invention with reference to drawings. In FIGS. 5, 6, and 7, reference numeral 41 designates a screw fitted into a fender 61 of a car body 60. The screw 41 has a head 44 provided with a flange 43. The head 44 is formed with a cross recess 45 on its top. Further, a hard polyamide resin (Nylon 66) covers the head 44, forming a spherical head 46 with the cross recess 45 exposed to the outside. In this connection, the spherical head 46 may be formed integrally with the screw 41 by the same steel material.

Reference numeral 47 designates an elastic clip formed of a polyacetal resin and mounted on a bumper 62. The elastic clip 47 has an engaging groove portion 48 formed in such a manner that it has a cross-section corresponding in shape to the external shape of the spherical head 46 described above, and a receiving lip portion 48a formed continuous with the respective longitudinal edge of the groove portion 48, and, the receiving lip spreading outward. The groove portion 48 and the receiving lip portion 48a form a main body of the clip 47 having a cross-section in the form of a Greek capital letter omega $\Omega$. A portion 49 which is accurate in section is formed integrally on the reverse side of the main body for supporting the bumper 62 thereon. Reference numeral 50 (FIG. 7) designates a clip portion formed in the central part of the elastic clip 47 for pinching the bumper. The clip portion 50 comprises a pair of clipping members 51 and 52 opposed to each other with a small distance therebetween. The clipping member 52 has a projection 53 formed thereon for engagement with a through hole 64 formed through a fixture metal plate 63 of the bumper 62.

The preliminarily hold device having the above-described construction is used in the following manner: Beforehand, the screw 41 is screwed into tile fender 61 of the car body 60, while the elastic clip 47 is mounted on the bumper 62 by causing the clip portion 50 thereof to be engaged with the fixture metal plate 63 of the bumper 62. Then, the bumper 62 is placed along the car body 60, as shown in FIG. 8, and the engaging groove portions 48 of the elastic clips 47 are fitted on the spherical heads 46 of the screws 41 so as to be supported thereby.

In the process of preliminarily holding the bumper 62 onto the car body 60, even if there is some deviation in the positional relationship between the spherical heads 46 of the screws 41 fastened to the car body 60, and the engaging groove portions 48 of the elastic clips 47 arranged on the reverse side of the bumper 62, due to distortion in the formed shape of the bumper 62 and dimensional and/or positional errors in assembly of the car body 20, such deviation is absorbed by the engaging groove portions 48 formed continuous with the receiving lip portions 48a in such a manner that they turn outward as they extend. Therefore, even the bumper 62 having distortion in the formed shape thereof can be easily preliminarily held onto the car body 60 having the dimensional and/or positional errors in assembly, without requiring many hands of workers. Further, even an automatically-operating machine, such as a robot, which operates with high positioning accuracy, can preliminarily hold the bumper, and therefore it becomes possible for a robot or other automatic assembly machines to automatically mount the bumper on the car body.

As is clear from the above, the holding device according to the present embodiment of the invention has many advantageous features. Specifically, an ingenious combination of the screw having the spherical head and the elastic clip having the engaging groove portion with a cross-section corresponding in shape to the spherical head, which portion is formed continuous with the receiving lip portions formed in such a manner that they turn outward as they extend, makes it possible to easily preliminarily hold the bumper having distortion in the formed shape thereof onto the car body having dimensional and/or positional errors in assembly. Therefore, the bumper can be automatically mounted on the car body by the use of a robot or other automatic assembly machines. As a result, it is possible to reduce manufacturing cost by saving labor cost, as well as enhance productivity. Thus, the present invention has a great value for practical use.

What is claimed is:

1. A holding device for use in assembling mechanical members, comprising:
    a joint head including a substantially spherical head and a first fastener formed continuous with said substantially spherical head, said first fastener being adapted to be engaged with a first member; and
    a clip having a joint cavity member formed of an elastic material, said joint cavity member having a substantially straight groove portion having a cross-section substantially corresponding to shape to an external shape of said substantially spherical head, and a receiving lip portion formed continuous with said groove portion, said receiving lip portion spreading outward, and a second fastener formed continuous with said joint cavity member, said second fastener being adapted to be engaged with a second member;
    wherein said spherical head of said joint head is engageable in said groove portion of said clip so as to be held therein, whereby the first member which is engaged with said first fastener of said joint head and a second member which is engaged with said second fastener of said clip are preliminarily held to each other.

2. A holding device of claim 1, wherein:
    said first fastener of said joint head comprises a screw member connected to said substantially spherical head, said screw member being adapted to be screwed into said first member so as to be engaged with said first member; and
    said clip comprises an elastic clip member having said engaging groove Portion and said receiving lip portions, said elastic clip member further including said second fastener for engaging with said second member which is to be held to said first member.

3. The holding device of claim 2, wherein said second fastener comprises means for engaging an inner side of a bumper for an automotive vehicle, said second member comprising said bumper, and said first member comprising a body part of said automotive vehicle.

4. The holding device of claim 2, further comprising a plurality of said holding devices for use in holding said second member to said first member.

5. A holding device for use in assembling mechanical members, comprising:
    a joint head including a substantially spherical head and a first fastener formed continuous with said substantially spherical head, said first fastener being adapted to be engaged with a first member, said first fastener including a grommet formed of a synthetic resin material, said grommet having a fitting leg portion and at least one catching projection formed thereon, and said substantially spherical head including a hollow substantially spherical head connected with said fitting leg portion with a flange portion between said hollow substantially spherical head and said fitting leg portion, said grommet having a substantially central hole formed therein which is in communication with a hollow portion of said hollow substantially spherical head, said fitting leg portion of said grommet being engageable in a respective grommet-holding hole of a surface of said first member;
    said joint head further including a screw which is screwed into said substantially central hole of said grommet via said hollow portion of said hollow substantially spherical head, to retain said grommet in its respective grommet-holding hole; and
    a clip having a joint cavity member formed of an elastic material, said joint cavity member having a groove portion having a cross-section substantially corresponding in shape to an external shape of said substantially spherical head, and a receiving lip portion formed continuous with said groove portion, said receiving lip portion spreading outward, and a second fastener formed continuous with said joint cavity member, said second fastener being adapted to be engaged with a second member, said clip including an elastic clip portion having said groove portion therein, said second fastener comprising means engageable with a second member which is to be fastened to said first member;
    wherein said spherical head of said joint head is engageable in said groove portion of said clip so as to be held therein, whereby the first member which is engaged with said first fastener of said joint head and a second member which is engaged with said second fastener of said clip are preliminarily held to each other.

6. The holding device of claim 5, further comprising a plurality of said holding devices for use in holding said second member to said first member.

7. The holding device of claim 5, wherein said engaging means of said elastic clip comprises means for engaging with a reverse side of a rear lamp for an automotive vehicle, said second member comprising said rear lamp, and said first member comprising a body part of said automotive vehicle.

* * * * *